US009613026B2

(12) United States Patent
Hodson

(10) Patent No.: US 9,613,026 B2
(45) Date of Patent: Apr. 4, 2017

(54) SYSTEM AND METHOD FOR INTERACTIVE AUTOMATIC TRANSLATION

(71) Applicant: Bloomberg Finance L.P., New York, NY (US)

(72) Inventor: James Alexander Hodson, Jersey City, NJ (US)

(73) Assignee: Bloomberg Finance L.P., New York, NY (US)

( * ) Notice: Subject to any disclaimer, the term of this patent is extended or adjusted under 35 U.S.C. 154(b) by 472 days.

(21) Appl. No.: 13/729,838

(22) Filed: Dec. 28, 2012

(65) Prior Publication Data

US 2013/0173247 A1 Jul. 4, 2013

Related U.S. Application Data

(60) Provisional application No. 61/580,905, filed on Dec. 28, 2011.

(51) Int. Cl.
| | |
|---|---|
| *G06F 17/28* | (2006.01) |
| *G06F 17/27* | (2006.01) |
| *G06F 15/16* | (2006.01) |
| *G06F 3/048* | (2013.01) |

(Continued)

(52) U.S. Cl.
CPC .......... *G06F 17/28* (2013.01); *G06F 17/2827* (2013.01)

(58) Field of Classification Search
USPC ............ 704/2, 3, 4, 7, 9, 275, 254, 255, 10; 715/259, 816; 707/760; 709/229
See application file for complete search history.

(56) References Cited

U.S. PATENT DOCUMENTS 6,085,162 A * 7/2000 Cherny ............... G06F 17/2735 704/2
6,275,789 B1 8/2001 Moser et al.
(Continued)

FOREIGN PATENT DOCUMENTS

WO WO 2007/068960 6/2007

OTHER PUBLICATIONS

International Search Report issued in corresponding International Application No. PCT/US2012/072031.
(Continued)

*Primary Examiner* — Pierre-Louis Desir
*Assistant Examiner* — Neeraj Sharma
(74) *Attorney, Agent, or Firm* — Chiesa Shahinian & Giantomasi PC

(57) ABSTRACT

Embodiments of the invention relate to computerized systems and methods for automatically translating text between natural languages. Text for translation may be broken into segments, which may themselves be templates including placeholders. If an exact match for a segment is found in a translation database, the segment may be matched with its translation from the database. Otherwise, alternate source language text, corresponding to the segment, for which an exact translation is available, may be identified and presented to the user for selection. Text selected by the user may replace the original segment and be matched with its translation.

Translation of a segment may be influenced by other translated segments. Additionally, translations may be modified as the user interactively enters and edits text.

17 Claims, 14 Drawing Sheets

(51) Int. Cl.
*G06F 17/30* (2006.01)
*G10L 21/00* (2013.01)

(56) References Cited

U.S. PATENT DOCUMENTS

| | | | | |
|---|---|---|---|---|
| 7,020,601 | B1 * | 3/2006 | Hummel | G06F 17/278 |
| | | | | 704/1 |
| 7,027,975 | B1 * | 4/2006 | Pazandak | G10L 15/30 |
| | | | | 704/9 |
| 7,209,875 | B2 * | 4/2007 | Quirk | G06F 17/28 |
| | | | | 704/2 |
| 8,031,943 | B2 | 10/2011 | Chen et al. | |
| 8,209,178 | B1 * | 6/2012 | Talbot | G06F 17/2715 |
| | | | | 704/254 |
| 8,275,608 | B2 * | 9/2012 | Ah-Pine | G06F 17/241 |
| | | | | 704/10 |
| 8,412,532 | B2 * | 4/2013 | Gruenstein | G10L 15/32 |
| | | | | 340/4.4 |
| 8,548,794 | B2 * | 10/2013 | Koehn | G06F 17/2818 |
| | | | | 704/1 |
| 9,323,746 | B2 * | 4/2016 | Bangalore | G06F 17/2836 |
| 2001/0029455 | A1 * | 10/2001 | Chin | G06F 17/273 |
| | | | | 704/277 |
| 2004/0030542 | A1 * | 2/2004 | Fuji | 704/2 |
| 2007/0233460 | A1 * | 10/2007 | Lancaster et al. | 704/9 |
| 2007/0265825 | A1 * | 11/2007 | Cancedda | G06F 17/2818 |
| | | | | 704/2 |
| 2008/0120091 | A1 * | 5/2008 | Waibel et al. | 704/2 |
| 2009/0106017 | A1 | 4/2009 | D'Agostini | |
| 2010/0241416 | A1 * | 9/2010 | Jiang | G06F 17/28 |
| | | | | 704/7 |
| 2011/0060583 | A1 * | 3/2011 | Choi | G06F 17/2836 |
| | | | | 704/2 |
| 2012/0296633 | A1 * | 11/2012 | Chalabi et al. | 704/4 |

OTHER PUBLICATIONS

International Preliminary Report on Patentability issued in corresponding International Application No. PCT/US2012/072031.

* cited by examiner

FIG. 9

Bloomberg Translate

Save | Abc Spell-check | Dictionary | Thesaurus | Refresh Quality Metrics | Sharing & Collaboration Lights flickered, and the tarmac glistened, as the moon descended its broad arch to touch the outstretched arms of the desert.
The bright yellow car sped hastily along the highway.

Submit to Workflow...  [Doc ID #21776]

For review by  ⊠ Editors  ⊠ John  ▶ Review

Comments  The colour of the vehicle is not relevant, but the fact that it is on the highway, is.

Approve human translations?  ● Yes  ○ No  Submit

La voiture jaune vif roulait très vite sur l'autoroute.

Tools

Document Settings

Analyze Document Quality

Submit to Workflow

Advanced Options

Publish

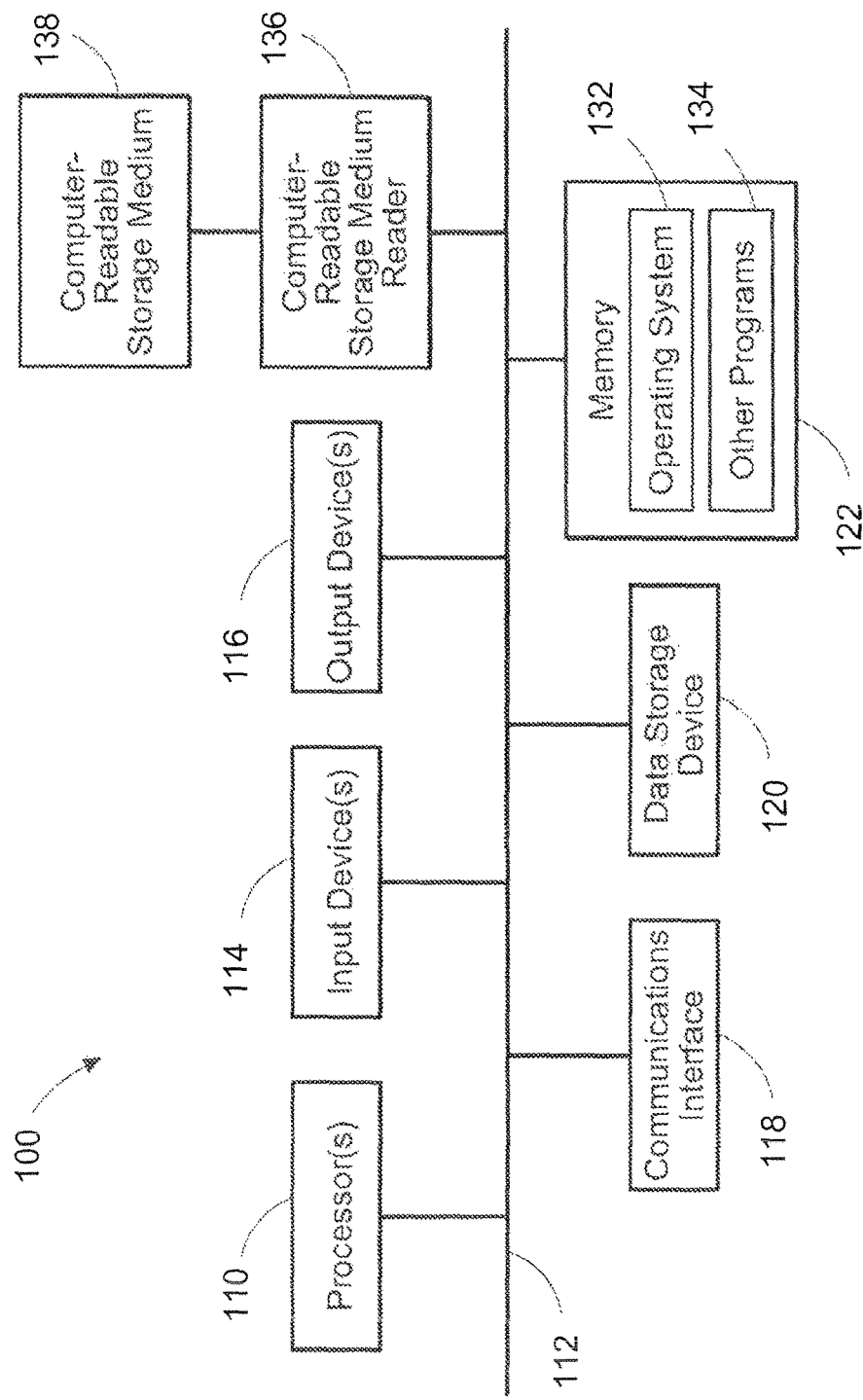

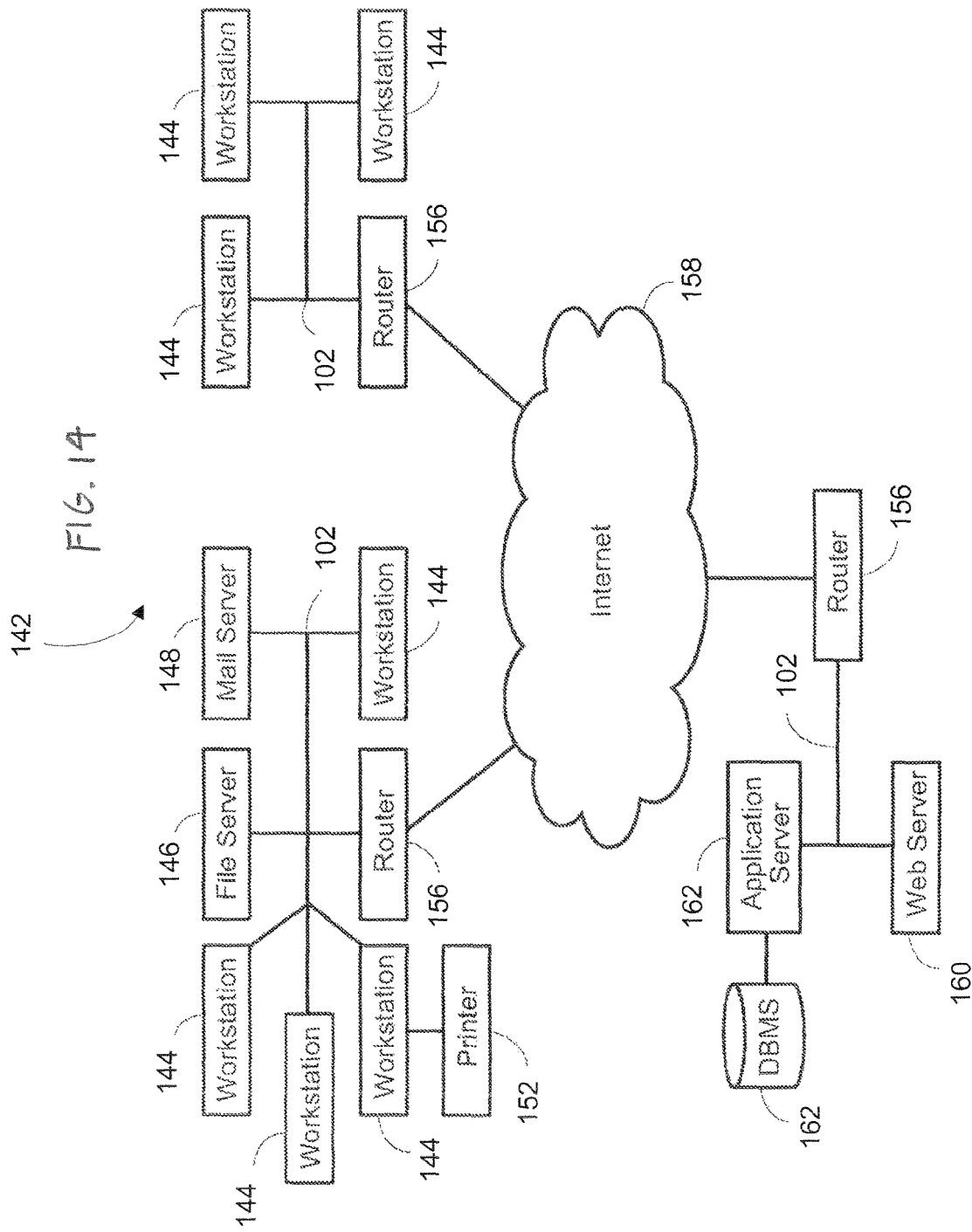

SYSTEM AND METHOD FOR INTERACTIVE AUTOMATIC TRANSLATION

CROSS-REFERENCE TO RELATED APPLICATION

This application claims the benefit of U.S. provisional patent application No. 61/580,905, filed 28 Dec. 2011 and titled "System and Method for Interactive Automatic Translation", which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Machine translation may refer to many different techniques and/or collections of tools related to automatically translating from one human language to another. The term "human language" is used herein to refer to languages that people typically use to converse with one another. It designates both organically developed languages, such as English, Basque, and Vietnamese, and invented languages, such as Esperanto and American Sign Language. It also designates both "living" languages such as Hindi and "dead" or "extinct" languages, such as Latin. The term is used in contradistinction to computer languages, such as C or LISP, which are artificial languages that are primarily used by people to express computations to a machine.

At its most basic level, machine translation may refer to mechanical substitution of single words in a target language for corresponding words in a source language (which may sometimes be referred to herein as the primary, or working language). This type of translation is usually unsatisfactory and often incomprehensible, for it commonly fails to account for varying grammatical rules, idioms, and language anomalies and/or idiosyncrasies. Although the field of machine translation has seen developments in past years, existing systems and methods still do not provide efficient systems for instantaneous and continuous translation of input at the same time by different users and into multiple languages simultaneously.

BRIEF SUMMARY OF THE INVENTION

Embodiments of the invention relate generally to computer systems and methods for automatic translation of text from one language to another or several others. More specifically, embodiments of the invention involve interactive translation of text in real time or near-real time as the user edits text. Embodiments of the invention may also involve an interactive machine translation engine.

In embodiments of the invention, translation may be informed by knowledge of two kinds of context. The first kind of knowledge is the context that the user specifies including the type of document (e.g., a technical manual, a novel, an instant message, journalism, etc.) and the desired level of formality. The second kind of knowledge is based on the automatic scanning of the text for patterns associated with different domains. A system according to an embodiment of the invention may adapt database searches to reflect these contexts, e.g., by searching only databases built from appropriate corpora. Knowledge and/or analysis of the context of the document may enhance the accuracy of the translation because different words may have different meanings in different contexts.

In an embodiment of the invention, a user may provide text in a primary language to be translated to one or more different target languages. The user can choose to view the translated text or can keep the translation hidden.

An embodiment of the invention may comprise a translation module that examines the source text as it is input by the user. The translation module translates words, phrases, or both, as they are entered by the user but may continually backtrack and incrementally update word translations as strings of words are developed to increase contextual accuracy. The translation module may limit its incremental updating to single sentences, or use linguistic clues from neighboring phrases and sentences to improve the candidate translations returned.

An embodiment of the invention may comprise narrowing the set of possible translations that must be evaluated (which may be referred to as the "translation search space") by displaying to the user candidate source language words/phrases/sentences that may be similar to text that the user provided. ("Text" is used in a broad sense and may, depending on the context, refer to one or more words, phrases, sentences, or combinations thereof) Candidate source language text may be retrieved from the database using linguistic similarity metrics, for example word edit-distance or parse-tree similarity, between what the user typed, and the human-edited translations available for the particular language pairs in question. In such an embodiment, the user may choose one of the candidate phrases as a direct replacement for the entered text, which may cause the translation to be within certain quality bounds for particular domains. The user may alternatively choose to ignore the candidate sentences. Having chosen a candidate phrase, the user may in an embodiment of the invention choose either to maintain the original phrase on the primary language side or to replace the phrase in the primary language with the selected candidate phrase also.

An embodiment of the invention may include identifying potential synonyms for entered text or parts of it. Such identification may be conditioned, e.g., on the knowledge about the document that has been obtained through manual entry and/or analysis of the document. An embodiment of the invention may create a translation environment that is interactively multi-lingual and offers bounds on translation quality, but without any user's target-language intervention.

According to an embodiment of the invention, a method of automatically translating text from one natural language to another is performed by a computer system that comprises one or more processors, one or more interfaces operatively coupled to at least one of the processors, and one or more computer-readable storage media operatively coupled to at least one of the processors.

The method comprises receiving text in a first language through at least one of the interfaces. At least one of the processors executes instructions retrieved from at least one of the computer-readable storage media to identify within the text a first segment that comprises a plurality of words, where the first segment consists of a complete or partial phrase or a complete or partial sentence. Executing the instructions, at least one of the processors also identifies in a database a first translation of a first source segment, (which corresponds to the first segment) into a second language that is not the first language.

According to the method, at least one of the processors executes instructions retrieved from at least one of the computer-readable storage media to identify within the modified text a second segment that comprises a plurality of words, where the second segment consists of a complete or partial phrase or a complete or partial sentence. Executing the instructions, at least one of the processors also identifies in the database a second translation of a second source segment (which corresponds to the second segment) into the second language.

According to an embodiment of the invention, the method comprises receiving input through at least one of the interfaces that represents a modification of the text. According to the embodiment, the second segment is identified in the modified text, the second segment comprises the first segment, and identifying the second segment occurs automatically in response to receiving the input that represents a modification of the text.

In an embodiment of the invention, identifying the second source segment is based on the first source segment.

In an embodiment of the invention, the first segment and the first source segment are identical, and the second segment and the second source segment are identical.

Alternatively, in an embodiment of the invention, the method comprises execution of instructions by at least one of the processors to identify one or more first candidate source segments, where each of the first candidate source segments differs from the first segment and has in the database an exact translation into the second language. The method also comprises, in response to receiving input through at least one of the interfaces that selects one of the first candidate source segments, designating the selected first candidate source segment as the first source segment. The instructions further cause the computer system to identify one or more second candidate source segments, where each of the second candidate source segments differs from the second segment and has in the database an exact translation into the second language. In response to receiving input through at least one of the interfaces that selects one of the second candidate source segments, the selected second candidate source segment is designated the second source segment.

In an embodiment of the invention, the first translation and the second translation are represented in the database as distinct units. In one such embodiment, the first translation and the second translation are templated translations.

In an embodiment of the invention, the instructions comprise instructions that cause at least one of the processors to identify in the database a third translation of the first source segment into a third language that is not the first language or the second language. The instructions also cause at least one of the processors to identify in the database a fourth translation of the second source segment into the third language. The second translation and the fourth translation are transmitted through at least one of the interfaces. In an embodiment of the invention, transmitting the second translation takes place effectively simultaneously with transmitting the fourth translation.

Embodiments of the invention also comprise computer systems configured to carry out these methods and computer-readable storage media encoded with instructions that, when executed by one or more processors in a computer system, cause the computer system to carry out these methods.

BRIEF DESCRIPTION OF THE DRAWINGS

FIGS. 8-12 depict additional user interface screens.

FIG. 13 depicts an example of a computer system such as may be used in connection with an embodiment of the invention.

FIG. 14 depicts interconnected computer networks such as may be used in connection with an embodiment of the invention.

DETAILED DESCRIPTION OF THE PREFERRED EMBODIMENTS

Various embodiments of the invention are described below with reference to the figures, where like reference numbers indicate identical or functionally similar elements. The described embodiments are meant to be illustrative and not limiting, and other embodiments of the invention will be apparent to those having ordinary skill in the relevant arts.

Figure 1:
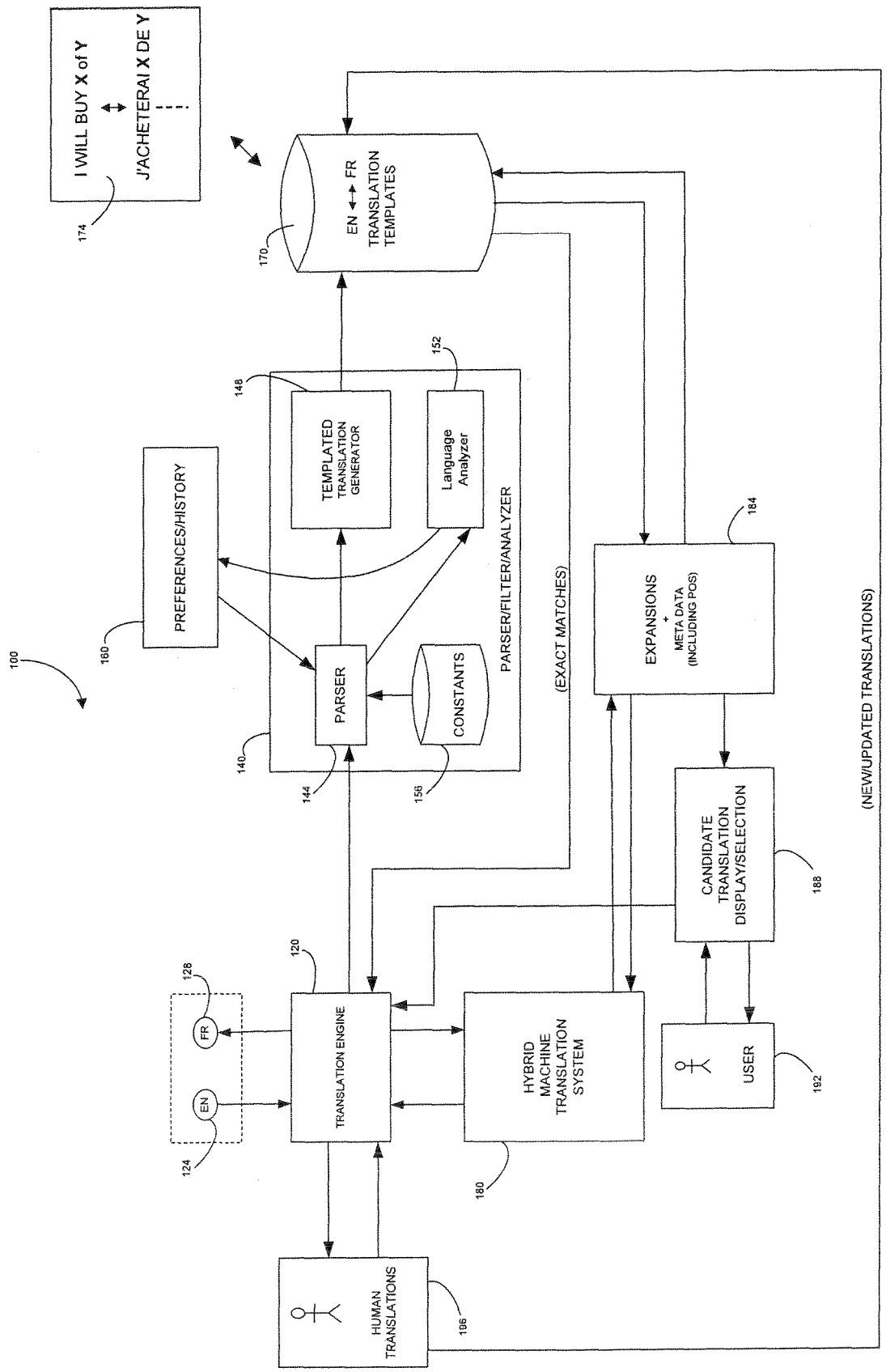
FIG. 1 is a schematic diagram illustrating relationships among logical components of an interactive translation system according to an embodiment of the invention.

FIG. 1 is a schematic diagram illustrating relationships among logical components of an interactive translation system 100 according to an embodiment of the invention. The depicted system 100 comprises a translation engine 120, which is configured to accept source text 124 in a source language and to emit translated text 128 in a target language. As depicted, the source language is English ("EN") and the target language is French ("FR"), but an embodiment of the invention may be configured to translate between any desired source and target languages. Additionally, as described below, an embodiment of the invention may be configured to translate among three or more languages instantaneously.

The translation engine 120, in an embodiment of the invention, may interact with a parser/filter/analyzer module 140. As FIG. 1 depicts, this module has several components which may cooperate, e.g., to transform the source text into a representation (not pictured) more amendable to further processing. For example, in an embodiment such as FIG. 1 depicts, the module 140 may comprise a parser 144, a templated translation generator 148, a language analyzer 148, and a database 156 of constants and/or other mechanism for identifying terms that should remain constant across languages.

The parser 144 may be configured to generate an intermediate representation of the source text 124. For example, according to an embodiment of the invention, the parser 144 may be configured to perform functions such as, e.g., "chunking," which comprises identifying subunits of the source text for processing as units, and part-of-speech identification.

Part-of-speech identification, which is also sometimes referred to as "grammatical tagging," includes (as the name suggests) identifying the part of speech of each word and word combination of the text. Reliable automated part-of-speech identification is well known, and numerous software packages and libraries that perform this function are available. In an embodiment of the invention, a Conditional Random Fields (CRF) approach may be used for this purpose, but other packages and libraries exist and are suitable.

Certain words or textual units, particularly proper nouns and other terms that identify specific entities (but not limited to them), may not be appropriate for translation. For example, in translating a document from English to French, the name "Barack Obama" will typically remain invariant. Identifying named entities, other constant terms, or both, may therefore improve the efficiency of translation by identifying terms that the system need not attempt to translate. Doing so may also improve the accuracy of the final translation by preventing the system from incorrectly using those terms as context for the translation of other terms. (Contextual translation according to embodiments of the invention is disclosed in more detail below.)

Thus, in an embodiment of the invention, the parser 144 may also be configured to scan the source text 124 for constants and/or named entities, which may include certain untranslatable words or textual units, e.g., "IBM," "Bernanke," "2.25%," etc. The parser 144 may identify constants and named entities, e.g., with reference to one or more databases or tables 156 and may mark found constants and named entities with appropriate metadata. The parser 144 may refer to these annotations in creating metadata for the remainder of the sentence.

The parser 144 may be configured to refer, e.g., to stored preferences and translation history 160 in processing the text. The parser 144 may also be in communication with a language analysis module 152, which may be configured to perform various functions, depending on the embodiment of the invention. For example, in an embodiment of the invention, the language analyzer 160 may be configured to detect the source language automatically. In addition to or instead of the foregoing, a language analyzer 160 may be configured to detect or infer properties of the source text 124, such as, e.g., the level of formality of the source text or the type of document or other communication being translated.

For example, in an embodiment of the invention, the level of formality may be inferred from computed similarity metrics between the text currently being considered and pre-computed language models (LMs) of differing formality. According to an embodiment of the invention, tri-gram language models (models consisting of single words, pairs of words, and triplets) may be constructed for each register of a language (level of formality), and a system may then compute the likelihood that the document in question could have been generated by each of these language models. Such a process may attempt to maximize the probability of the target phrase being generated by a particular language model, where each language model is built on text corpora representing varying formalities of the language in question.

A language model may describe the probability of a particular sequence of words (for tri-gram language models, 1, 2, or 3 words) occurring in a particular corpus of text that is taken to be representative of a particular language or formal register of a language. For each sequence of words, the probability of the occurrence of a particular word $w_i$, conditioned on the occurrence of words $w_{i-1}, \ldots w_{i-n}$ may be calculated according to the formula:

$$P(w_i \mid w_1, \ldots, w_{i-1}) = \frac{\text{count}(w_{i-(n-1)}, \ldots, w_{i-1}, w_i)}{\text{count}(w_{i-(n-1)}, \ldots, w_{i-1})},$$

and thus the probability of a particular sequence of words (the string being analyzed) may be given by:

$$P(w_1, \ldots, w_m) = \prod_{i=1}^{m} P(w_i \mid w_1, \ldots, w_{i-1}) \approx \prod_{i=1}^{m} P(w_i \mid w_{i-(n-1)}, \ldots, w_{i-1}).$$

Information produced by the language analyzer 160 may, in an embodiment of the invention, be included in the stored preferences and translation history 160, e.g., to improve the quality of the ongoing translation.

As FIG. 1 depicts, the parser 144 may interact with a templated translation generator 148. In an embodiment of the invention, the templated translation generator 148 may use the intermediate representation produced by the parser 144 to produce a translation of the source text 124. In doing so, the generator 148 may refer, e.g., to a database 170 of templated translations 174.

For any chunk separated from the source text 124, the generator 148 may find an exact match in one of the databases 170. If no exact match is found, however, then (as described more fully below), according to an embodiment of the invention, the translation engine 120 may use a hybrid machine translation system 180 to identify candidate phrases for the translation. In finding candidates, the hybrid system 180 may refer to tools and/or databases to find possibly equivalent words and phrases to those in the source text 124, which may then be used to find candidate phrases, e.g., in the database 170, or returned as-is.

In an embodiment of the invention, the translation system 100 may comprise a module 188 configured to present the candidate phrases to the user 192. This module 188 may be configured to provide the user's selection to the translation engine 120.

In an embodiment of the invention, a translation system 100 may provide source text to the human translators, e.g., on call to translate input in real time, if the hybrid machine translation is unable to provide an acceptable candidate translation. The translator's translation may then be provided to the translation engine 120. The translation may also be added to the database 170, e.g., for future use.

Figure 2:
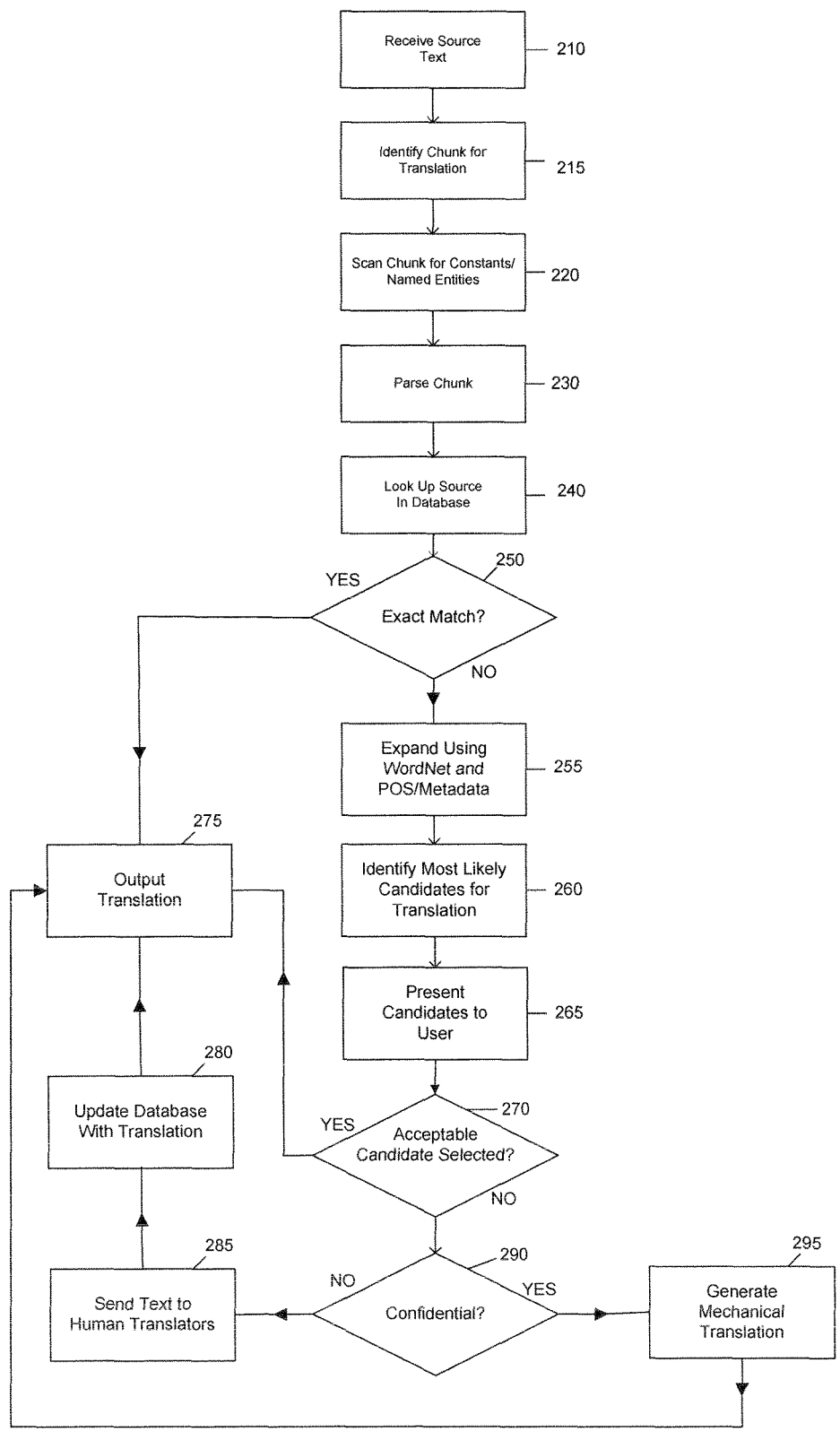
FIG. 2 depicts the flow of translation according to an embodiment of the invention.

FIG. 2 depicts the flow 200 of translation according to an embodiment of the invention. As depicted, translation begins in block 210, when the translation engine 120 (FIG. 1) receives source text, e.g., from the user 210.

According to an embodiment of the invention, as FIG. 2 depicts, the translation engine breaks untranslated text into chunks in block 215. So far as possible, each chunk may be translated as a unit, although the selected translation may embody certain kinds of dependencies upon other chunks. Chunking text may, for example, enhance identification of phrasal units, which may be translated more accurately as units than as individual words. Chunking text may also in an embodiment of the invention provide a context for translated words, making for a more accurate translation, but may also limit the amount of context provided, e.g., for the sake of efficient processing. Reflecting these considerations, according to one embodiment of the invention, chunks might not extend across identified sentence boundaries.

As the length n of a chunk increases, it may become less likely that an exact n-gram match will be found in the database. Reflecting this observation, in an embodiment of the invention, the maximum length of a chunk might not exceed some threshold. For example, empirical evidence suggests that a translation system according to certain embodiments of the invention may find few matches for strings of more than five words, even as the size of the language model increases. Thus, in an embodiment of the invention, the threshold may be set to five words, although in other embodiments, other concerns (for example, particular domain considerations) may suggest that shorter chunks, or even larger ones, may be appropriate.

In an embodiment of the invention, once a chunk has been broken off for further processing, the translation engine 120 may identify constants 220 and/or named entities within the chunk. This step may identify, e.g., symbols and groups of symbols that are invariant over translation. One kind of invariant symbol is proper nouns; for example, names of individuals (e.g., "Bernanke" and "Paul McCartney") or businesses (e.g., "Microsoft" and "Xerox") are not ordinarily altered when text is translated between languages that use equivalent character sets or accepted transliteration rules. Numbers expressed as numerals (e.g., "100" and "15%") may also be marked as constants, although numbers expressed as words (e.g., "one hundred" and "fifteen percent") may not be so marked. Depending on the embodiment of the invention, other terms, symbols, or both, may be identified in block 220 instead of or in addition to some or all of the foregoing. Despite the description herein of certain symbols as "invariant", in an embodiment of the invention, block 220 may include transliteration of some or all of such symbols for those languages where accepted formalized mappings exist (e.g., Latin ↔ Cyrillic; or Simplified Chinese ↔ Traditional Chinese).

In some cases, identification of constants or named entities may involve simple pattern recognition and/or looking up terms in a database and/or other data structure. But it will be appreciated that identification of constants and named entities may in some cases be contextual. For example, the word "apple" may refer to the fruit in one context but to Apple Inc. in another. Identification of constants and/or named entities in block 220 may therefore in an embodiment of the invention include reference to additional information, including, e.g., examination of other words near a term being identified.

As depicted in FIG. 2, the parser 144 (FIG. 1) parses the current sentence and may generate and/or attach relevant metadata for the current chunk of text in block 230. In an embodiment of the invention, the parser creates a representation of the text as a structure called a parse tree, that indicates the relationships among the terms found in the chunk. For example, the nodes of a parse tree may represent phrases, clauses and terms (including single words), with metadata attached to nodes to indicate, e.g., parts of speech and other information.

Figure 3:
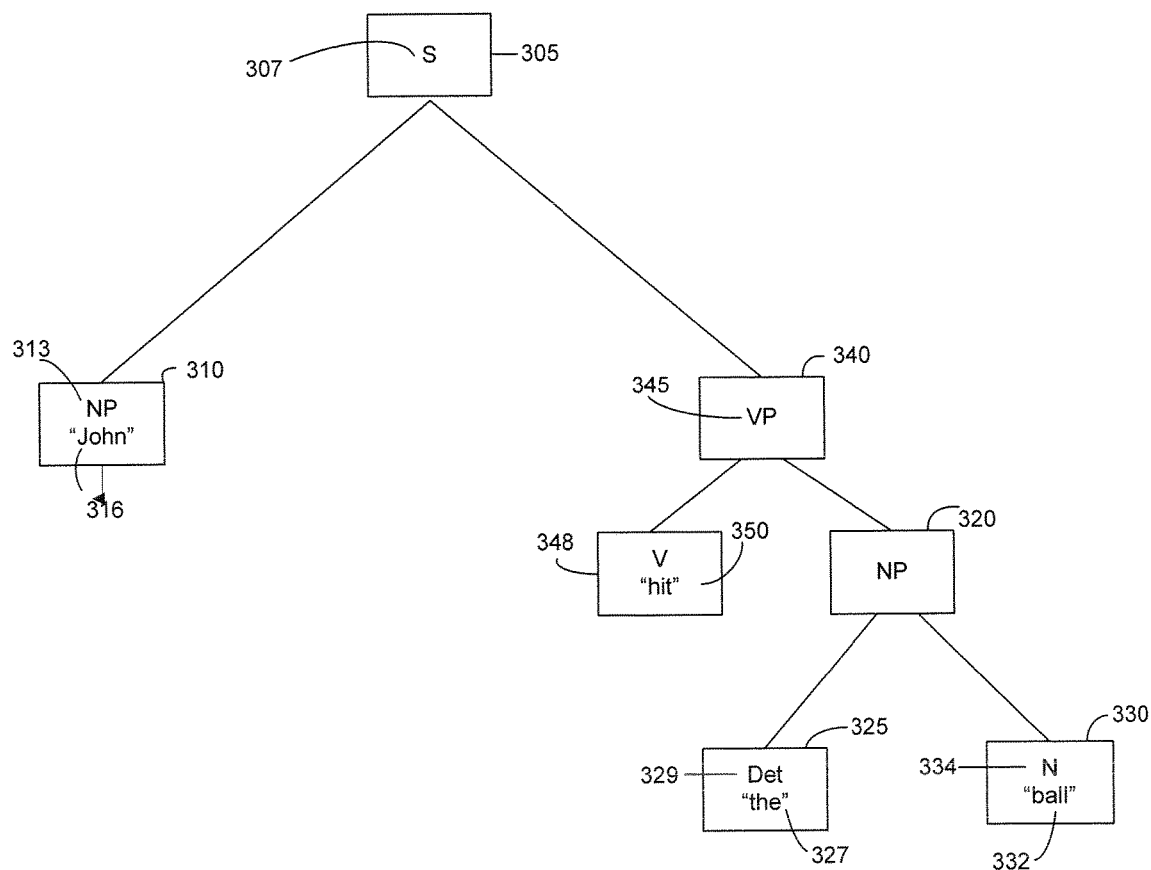
FIG. 3 depicts a simple parse tree such as may be created in connection with an embodiment of the invention.

FIG. 3 depicts a simple parse tree 300 such as may be created in connection with an embodiment of the invention. As depicted, for example, the parse tree 300 represents the simple sentence "John hit the ball." A parse tree 300 may comprise a root node 305 that may stand for the whole chunk or (as here) sentence. The label "S" 307 of the root node 305 represents the metadata that, in an embodiment of the invention, may indicate that the parse tree 300 that begins at the root represents an entire sentence.

The depicted parse tree 300 includes a node 310 corresponding to the subject of the sentence 305. The depicted node 310 is labeled "NP" 313 to indicate that it represents a noun phrase, which is here the single word "John". The node 310 is a leaf node and may therefore include the text 316 of the word or phrase that it represents.

The depicted parse tree 300 includes a node 320 that represents a second noun phrase, which is the object of the sentence 305. As depicted, the noun phrase includes two words, which are represented by leaf nodes 325 and 330. One node 325 represents the definite article "the" 327 and is marked "Det." 329 for determiner. The other node 330 represents the noun "ball" and is accordingly marked "N" 334.

As depicted, the predicate 340 is marked "VP" 345 for verb phrase. The transitive verb "hit" 348 is marked "V" 350.

It will be appreciated that the parse tree, representation, and markings disclosed above and depicted in FIG. 3 are intended to be only illustrative, exemplary, or both. Embodiments of the invention may represent parse trees, their components, and/or their attributes in ways substantially different from those disclosed herein. Alternatively, embodiments of the invention may use representations wholly different from parse trees for some or all text being translated.

Returning to FIG. 2, after the chunk has been parsed in block 230, the templated translation engine 148 (FIG. 1) attempts in block 240 to find an exact match for the parsed chunk (often a phrase or sentence), e.g., in a database 170 (FIG. 1) that maps words and phrases from one language to another.

Some or all of the mapped phrases may be, e.g., in the form of parameterized templates. For example, the database 170 may include a mapping 174 (FIG. 1) of the English phrase "I will buy X of Y" to the French phrase "J'achèterai X de Y", in which X and Y stand for parameters. In an embodiment of the invention, the templated translation engine 148 (FIG. 1) or other component may find an exact translation for the templated form, identify the English words in the places of the parameters X and Y, identify their French counterparts, and insert those counterparts in the appropriate places in the translated phrase to complete the translation.

A parameterized template, such as one representing, e.g., a phrase or a sentence, can be considered to be a string of constants (e.g., "will", "buy" in the example above) and constrained variables (e.g., X and Y). The constrained variables may be described by attributes such as, e.g., part of speech (POS), number, gender, domain, etc. For example, X above may be identifies a quantifying adjective (such as many, few, 5, etc.).

As text is received by the translation engine, each segment (word, chunk, phrase, sentence, etc.) may be tagged, e.g., for attributes such as may be associated with a constant or variable. The template matching engine then identifies potentially matching templates in its database, e.g., by matching constants exactly and matching attributes of segments to those of constrained variables. If a perfect match is found, it is returned, and the sentence is constrained to fit into the template's target form. In an embodiment of the invention, the internal representation of templates and attributes may be captured through a UIMA-like XML framework such as the one documented at http://www.oasisopen.org/committees/tc_home.php?wg_abbrev=uima, with attribute-bucketed hash-maps for fast retrieval of candidate templates.

If it is determined in block 250 (FIG. 2) that an exact match is found in the translation database 170 (FIG. 1), then, in block 275 (FIG. 2), the templated translation engine 148 (FIG. 1) may return the translated phrase to the translation engine 120 (FIG. 1), which will output the translation 128 (FIG. 1) in the target language.

If it is determined in block 250 (FIG. 2) that no exact match to the source text is found in the translation database 170 (FIG. 1), then the translation engine will expand its search using, e.g., WordNet® and Part-of-Speech ("POS") tagging, among many other potentially applicable lexical resources, both monolingual and multilingual 255.

If an exact match cannot be found, the translation module may in an embodiment of the invention attempt to find candidate translations that appear statistically likely to correspond to the entered text. As FIG. 2 depicts, this part of translation may begin in block 255 with finding synonymous words, phrases, or sentences to the text entered by the user 255.

In an embodiment of the invention, the input text received from the user may undergo feature expansion when a direct match is not found. Feature expansion may include one or more steps of processing, transforming, and/or annotating the text. Such steps may in an embodiment of the invention include, e.g., one or more of: attaching POS tags to segments, breaking or rearranging text into chunks, identifying synonym sets, creating and/or transforming parse trees, abstracting event frames, retrieving domain information, and detecting a level of formality, among many measures that are known to the art and may be suitable. The results of feature expansion may be used, e.g., to extract words/phrases in the database that are determined to be syntactically, semantically, grammatically, or lexically close to the source text through some method of scoring similarity.

For example, in an embodiment of the invention, the translation engine may use an already existing database such as WordNet® to expand its results. WordNet® includes a large lexical database of English, in which nouns, verbs, adjectives, and adverbs are grouped into sets of cognitive synonyms ("synsets"), each expressing a distinct concept. Synsets in WordNet® are mapped by semantic and lexical relations. In such an embodiment, the translation engine may use WordNet® to choose words and phrases that represent the closest synonym set to the text entered by the user.

The translation engine in such an embodiment may use WordNet and POS tagger/metadata 255 to determine alternative synonymous candidates to the source text originally entered. The translation engine may then rank the synonymous candidates 260 and present them to the user 265. The translation module performs mathematical optimization operations on metadata attached to the words/phrases to determine which candidate most syntactically and semantically meet the user's inputted text.

In addition to or instead of the foregoing, the translation module may generate translations by using a POS tagger 255. A POS tagger 255 typically takes a sentence or phrase and assigns a part of speech to that phrase based on statistically determined probabilities from a large corpora of similar text. Once parts of speech receive tags, such as "noun phrase" 310 or "verb transitive" 330 (e.g., by having corresponding metadata attached and/or otherwise associated with a representation of the text), the tags may be used to match user input to phrases with similar properties in the database. In some embodiments, partial matches may be combined with other partial matches to help produce the desired translated output.

As mentioned above, a scoring technique may be used to select candidate translations that may correspond to the entered text. In an embodiment of the invention, scoring similarity may be a two-step process. First, the search space of candidates may be drastically reduced by identifying entries that match a minimum set of essential criteria, which may be selected, e.g., based on the document's properties, lexical heuristics from the expansion, or both. In other words, based on the document's properties, certain attributes may be considered relatively more important to the translation; and based on the closeness of candidates formed through the expansion, certain attributes may also receive greater weight. Second, some distance metric between the input text and the remaining options may be defined, computed, or both. For example, such a metric in an embodiment of the invention could be a simple weighted feature edit-distance, whereby the algorithm counts the number of permutations that a candidate must go through in order to be transformed into the input text. Each step in this chain of permutations may weighted by the importance of the attribute in question, thus arriving at the candidate with the smallest set of errors and the least overall impact on the quality of the translation. In an embodiment of the invention, if no candidate reaches a threshold level of weighted similarity, this part of the process may be terminated and the result discarded in favor of human or other translation options.

Other statistical approaches are also possible to define similarity, such as k-means clustering, or any other metric between the expanded feature representation of candidate entries and the original input text may be used. A person skilled in the art will recognize that many scoring schemes or distance metrics would be acceptable solutions to this problem and that, depending on the embodiment of the invention and the problem domain, different schemes and/or metrics, and/or combinations thereof, may be appropriate.

Once one or more candidate statements in the source language have been identified, they will be presented to the user in block 265 for selection. In an embodiment of the invention, the candidates may be listed, e.g., in the order of statistically-determined likelihood that they are the best match for the originally-entered text.

In block 270, it is determined whether the user has selected an appropriate candidate or determined that no candidate is acceptable. If the user indicates that one candidate in the source language acceptably matches the source statement, the translation module retrieves the target language translation that exactly matches the selected source language statement and outputs it in block 275. In an embodiment of the invention, the database 170, may be updated to reflect the new information, i.e., that this alternative candidate may also be a suitable translation for the specific phrasal unit in the source language.

If it is found in block 270 that the user has not selected an alternative candidate, e.g., because the alternatives are unacceptable or unavailable, in an embodiment of the invention, there may be multiple choices for completing the translation. One alternative, in an embodiment of the invention, is that the user can send the source text to a pool of live translators for manual translation in block 285. The manually translated phrase may be used to update the translation database 170 (FIG. 1), so that the source phrase need not be manually translated again, and then it may be output in block 275.

Manual translation may not always be available or appropriate. For example, in an embodiment of the invention, manual translators may not be available. Or in a particular instance, it may be determined, e.g., as represented in FIG. 2 by block 290, that the text is confidential. In such cases, the source text may be subjected, e.g., to phrase-based statistical translation in block 295. An example of a well-known system configured for such translation is the Moses statistical machine translation decoding engine by Philipp Koehn.

Figure 4:
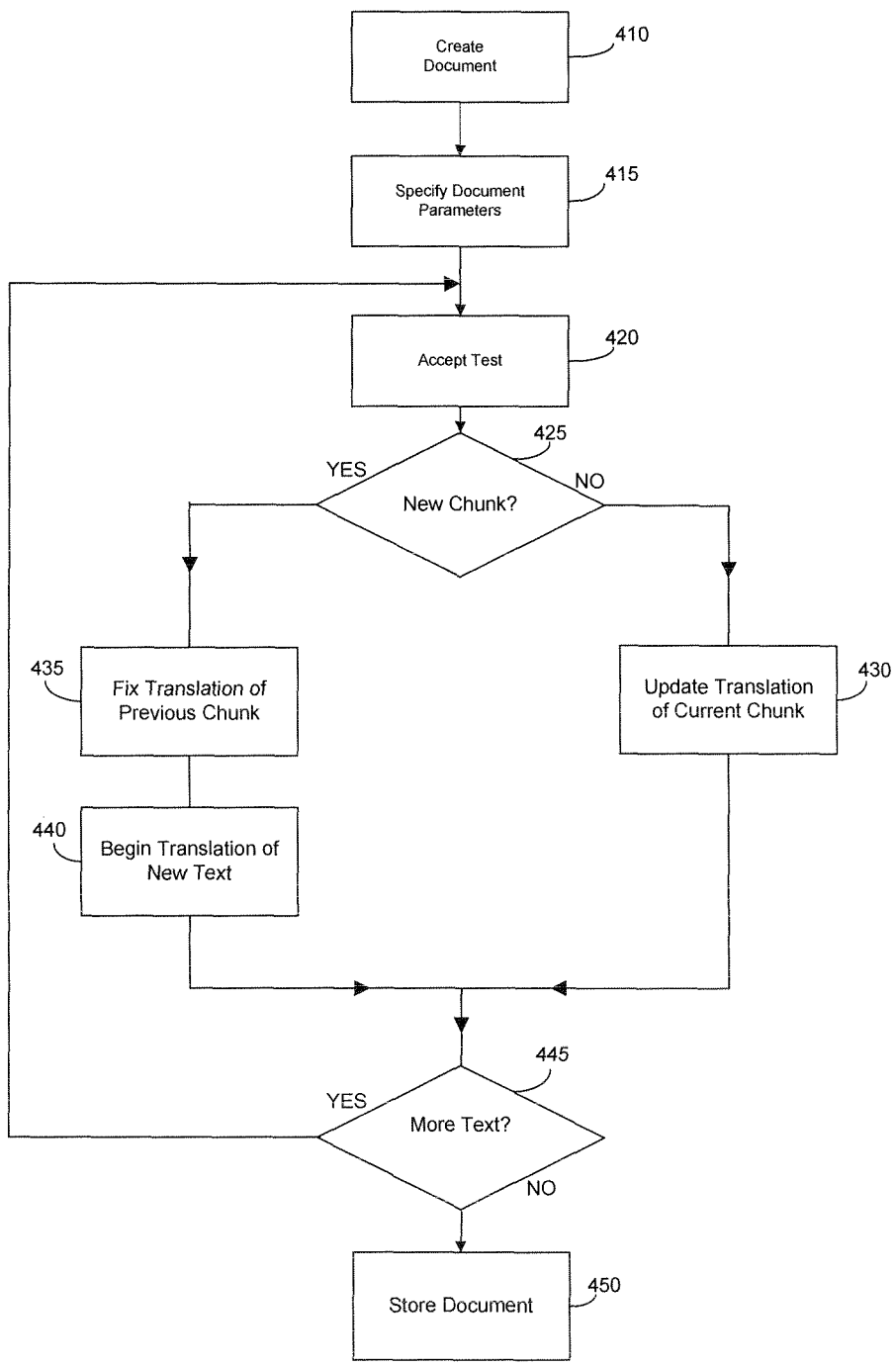
FIG. 4 depicts the flow of composition of a document in a source and target language simultaneously according to an embodiment of the invention.

A translation system according to an embodiment of the invention may be used in different workflows. FIG. 4 is a block diagram illustrating the flow 400 of composition of a document in a source and target language simultaneously according to one such embodiment.

Figure 5:
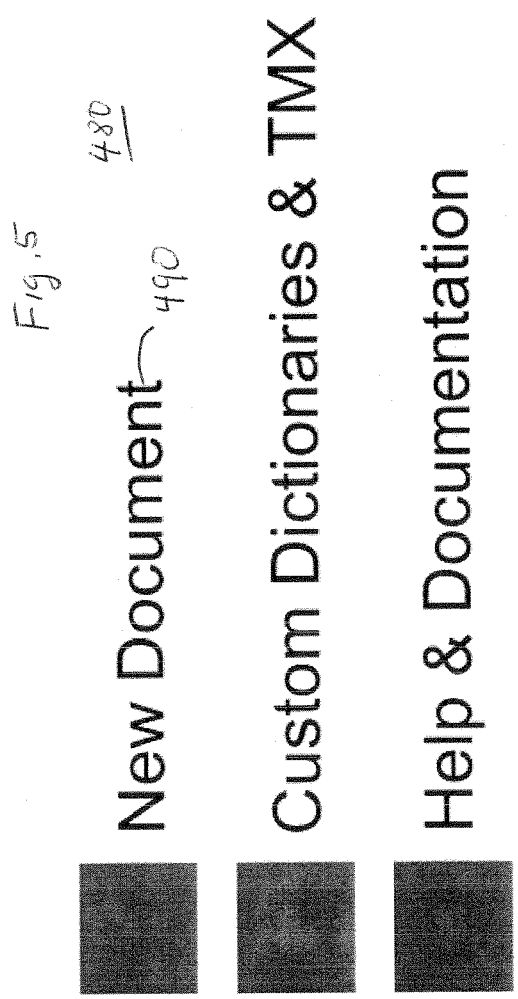
FIG. 5 depicts a user interface screen that displays options that may be presented to a user in an embodiment of the invention.

In an embodiment of the invention, composition 400 begins in block 410, when the user initiates composition, e.g., in a way appropriate for the user's system. In an embodiment of the invention, for example, the user may request access to an interactive translation system, e.g., by selecting the system from a menu of available options or by entering text that specifies a command, a destination, or both. Entering the translation system may cause display to the user of a screen 480 such as FIG. 5 depicts, from which the user may select a menu item 490 indicating that the user wishes to create a new document. Alternatively, as FIG. 5 depicts, the user may choose to return to a current project, e.g., from a list 495 of available projects.

Figure 6:
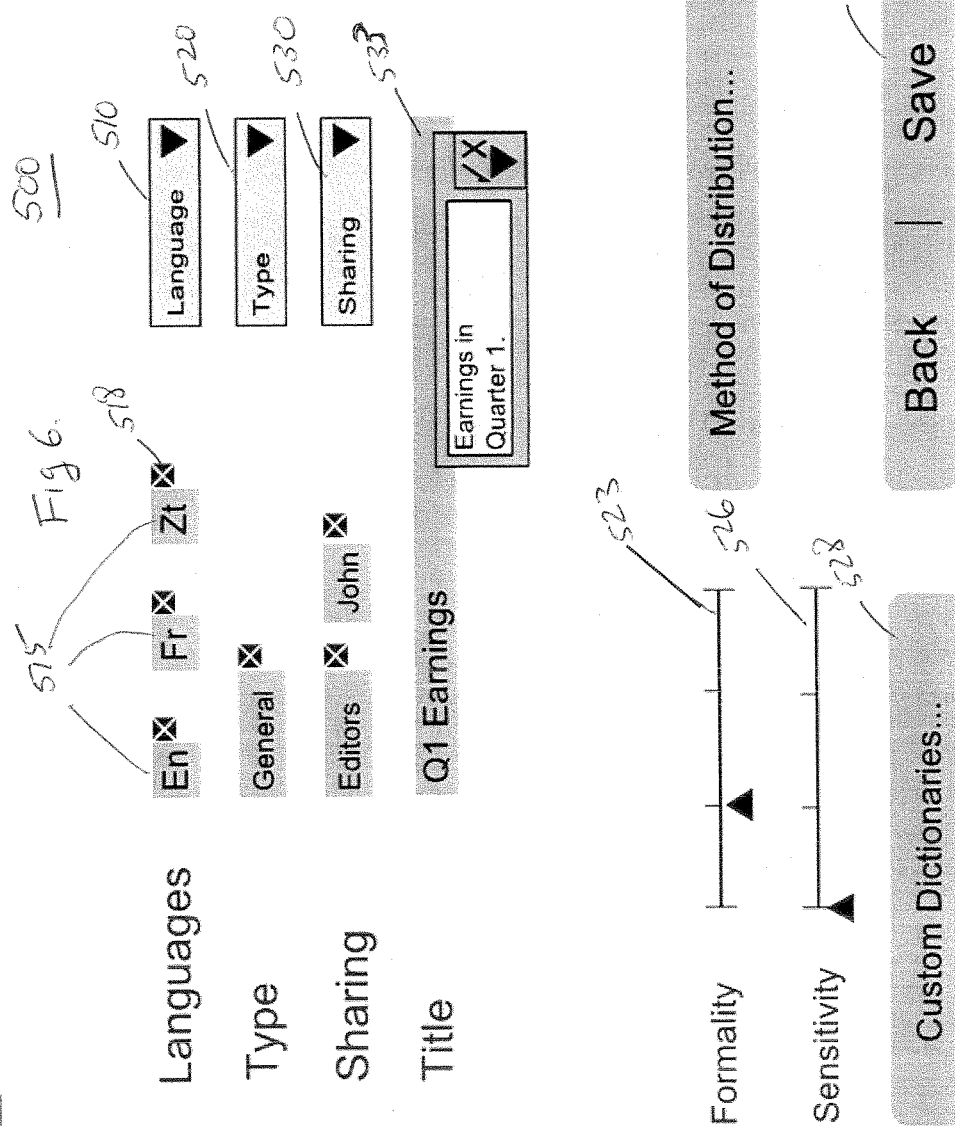
FIG. 6 depicts a user interface screen that may be used to specify parameters for a document and translation in an embodiment of the invention.

Once the user has chosen to create a new document in block 410 of FIG. 4, the user may then specify parameters for the document and translation in block 415. The user may do so in an embodiment of the invention in connection with a user interface screen 500, e.g., as FIG. 6 depicts. The screen 500 may include, e.g., standard user interface elements through with the user may supply and/or modify the information.

In an embodiment of the invention, the screen may include a drop-down menu 510 or other control for selection of one or more languages for the new document. The languages already selected 515 may be listed near the drop-down menu 510. The user may remove a language 515 from the list, e.g., by selecting an area 518 adjacent to the symbol that stands for that language.

Although translation of text has been discussed above in terms of "source" and "target" languages, it will be appreciated that in an embodiment of the invention, it may be possible to regard a document as having no source or preferred language. That is to say, that all of the listed languages 515 may be considered equivalent in connection with the document. This would follow from the use of exact translations for all (or nearly all) of the text that the user enters, including offering alternative source language statements to the user in place of those for which exact translations cannot be found. Thus, the user in block 415 (FIG. 4) may be considered to be using the screen 500 (FIG. 6) simply to select the languages 515 for the document (all of which may be considered equivalent in relation to that document) and not selecting target languages into which the document as a whole is to be translated.

An embodiment of the invention may support collaboration by multiple parties, and in multiple languages, in creating the same document or set of documents. In such a case, each contributor may work in a different "source" language. But the document itself may be considered not to have a source, primary, or working language in any meaningful sense.

In an embodiment of the invention, the screen 500 may include controls for adjusting, e.g., the formality and context of the document, which may help the system to select more appropriate translations. For example, a control 520 may allow the user to select the type of document (e.g., a technical manual, a novel, an instant message, a journal, etc.), and a control 533 for specifying a title of the document. Other controls may allow the user to set directly the desired levels of, e.g., formality 523 and sensitivity 526 (e.g., confidential or non-confidential) for the document. The user may also in an embodiment of the invention be given a control 528 for specifying one or more custom dictionaries for use in translation.

In addition to or instead of the foregoing, the user may in an embodiment of the invention have a control or other user interface element or elements (not pictured) that may allow the user to choose a minimum "quality" level for the document. The quality level may, e.g., specify a cut-off for displaying candidate sentences to the user. Setting a quality level may also lead the system to make processing decisions that will optimize this parameter where necessary.

For example, in an embodiment of the invention, quality might be defined as an integer between 1 and 100 that the user can select, such that a number closer to 1 indicates that the translated text need not be so strictly audited before release, and closer to 100 indicates that the translation's quality must be verified as completely coherent in both message and style before it can be released. Instances of the former might be instant message conversations between friends, whereas the latter might correspond to releases of important economic numbers.

In an embodiment of the invention, "quality" may refer to the aggregate suitability scores determined during feature expansion and candidate translation retrieval. The scores, as previously described, could include several dimensions, including, e.g., one or more of: domain suitability, lexical similarity, grammatical structure, and formality. Such an embodiment may implicitly reflect a view of building a translation document as an optimization problem at each step, where the translation system may try to select the translation candidates that provide the largest aggregate score above the user's threshold. In such an embodiment, where the system is unable to find translation candidates with high enough quality scores, phrases may, e.g., be flagged for review or automatically sent to the appropriate group of human translators/editors.

When a document lacks a source, primary, or working language, e.g., in the case of multilingual collaboration, quality scoring may, in an embodiment of the invention, be limited to chunks, sentences, or both. Scores in such an embodiment may be directed between the user-authored text and the system-generated candidates, regardless of the languages involved. Where a particular chunk has been worked on in all or several primary languages, the user may in an embodiment of the invention choose to lock and decouple these versions, which may be reflected in an implementation by, e.g., causing the system to consider the score to be very high for both versions. If substantial changes are later made to a locked chunk, the scores may be calculated in the prevailing direction as before.

Figure 7:
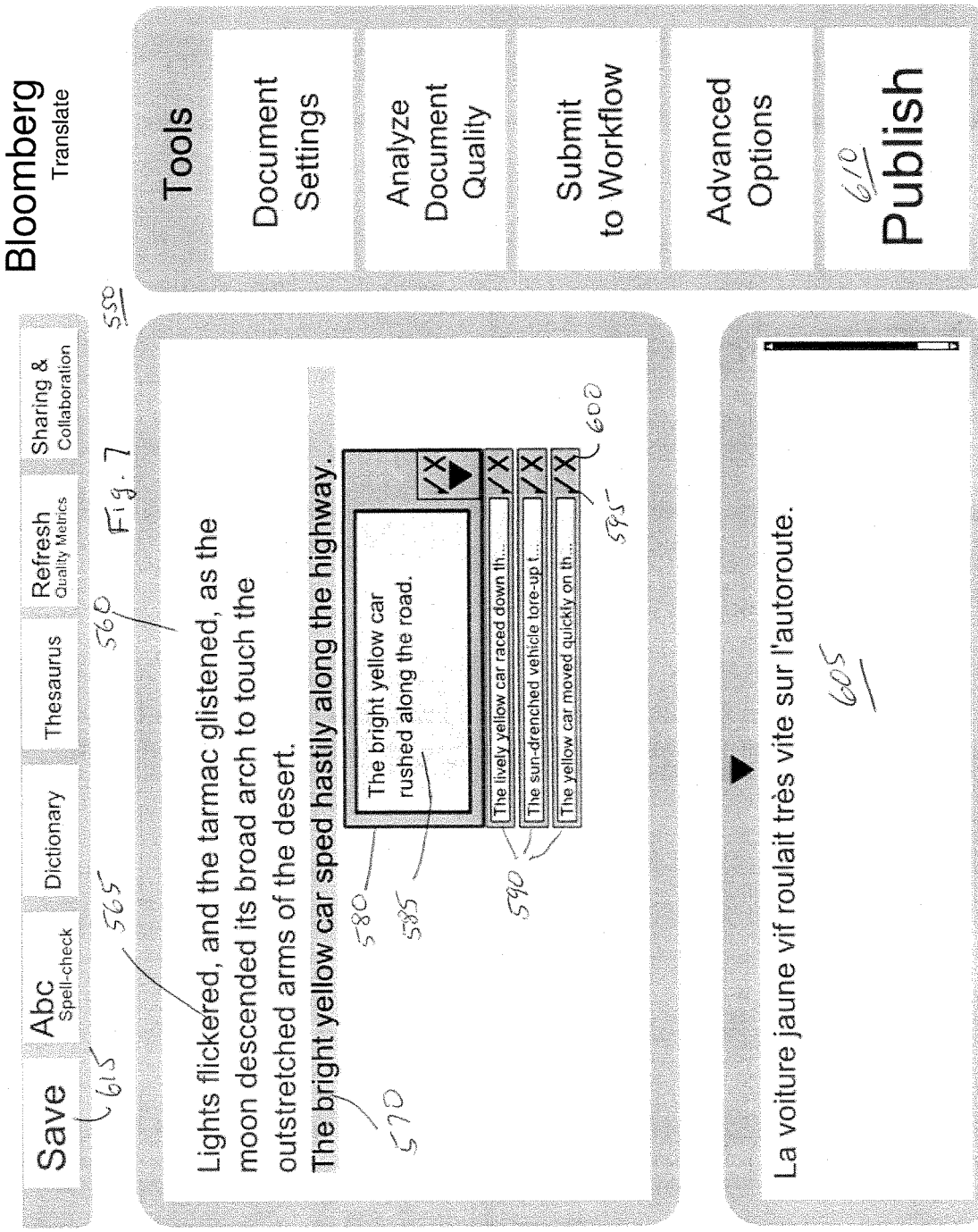
FIG. 7 depicts a user interface screen that may be used for document composition in an embodiment of the invention.

In an embodiment of the invention, the user may also give a title 830 to the document. As depicted, other controls allow the user to specify individuals and/or groups with whom the document may be shared (e.g., for collaboration or post-editing/review) 530 and the method of distribution 535. When the user is satisfied with the settings, the user may select the "Save" control 540 to create the document and then begin composing it, e.g., through a user interface screen 550 such as FIG. 7 depicts.

In an embodiment of the invention, the user may have access to linguistic tools while composing or editing the document. These tools might include, among many possibilities, spell-checking utilities, multi-lingual dictionaries with contextual references, thesauruses, and quality indicators, such as may indicate those chunks needing the most work (e.g., through highlighting). These tools might be activated, e.g., through a toolbar appearing above the document authoring window (FIG. 7) and/or through other user interface components (not pictured), as will be appreciated by those having skill in the art. Words and chunks might be highlighted in the text, and the multilingual dictionary/thesaurus reference could then be retrieved. These tools might be tailored to give examples from the document's domain, so as to be most useful to the author/editor. The quality metrics tools might use the individual chunk scores, along with heuristics over neighboring chunks to highlight those sections whose quality does not attain a particular threshold, or has a marked variance from the surrounding chunks. A user might be able to modify this threshold, and to work on improving these chunks, or flag particular areas for later review by other collaborators.

Returning to FIG. 4, the system then enters a loop in which it accepts text from the user and interactively updates the translation as the user continues to modify the text. A screen 550 such as FIG. 7 depicts may in an embodiment of the invention comprise a text entry and/or editing area 560, which may display the text 565 in the user's working language. As discussed above, the system may translate text as units or chunks, which may (but need not) represent a complete phrase, clause, or sentence. As FIG. 7 depicts, a sentence 570 that includes the current chunk is highlighted in the display.

As the user enters text in block 420 of FIG. 4, the system determines periodically in block 425 whether to continue updating the translation of the current chunk or to begin processing a new chunk. In an embodiment of the invention, such periodic evaluation may take place after every user action that changes the text at all, including without limitation after every keystroke. Alternatively, in an embodiment of the invention, the periodic evaluation may take place less frequently, e.g., waiting at least for short pauses between keystrokes such as may occur naturally during composition. Such pauses may also reflect a design decision to refrain from frequently prompting the user to select among candidate translations (as described below), which may become bothersome if it occurs, e.g., after every keystroke.

If the system determines in block 425 that updating the current chunk is appropriate, it may process that chunk in block 430, e.g., as FIG. 2 depicts. Alternatively, if it determines in block 425 that a new chunk is to be processed, in block 435 the translation of the previous chunk may be fixed, e.g., in working storage, and in block 440 the system may begin to translate a new chunk.

As disclosed above, if an exact match is not found for particular source text, the system in an embodiment of the invention may attempt to find candidate phrases, clauses, or sentences in the source language for which exact translations are known and which have the same meaning (or similar/synonymous meanings) to the original source text. The user may select one of these proposed expressions in the source language, and, if so, the selected expression will replace the original expression in the text editing area 560 (FIG. 7), and the foreign translation of the replacement expression 605 will be added to the translation.

FIG. 7 depicts the presentation of such candidates according to an embodiment of the invention, in a region 580 adjacent to the sentence 570 currently being translated. As depicted, for example, the alternate source phrase 585 scoring the highest in similarity to the translated sentence 570 is at the top of the list of suggested alternate source phrases 590. Next to each source phrase 585, 590 are symbols that a user may select to accept 595 or reject 600 a particular replacement phrase.

It will be appreciated that previous translation in a session, document, or both, may in an embodiment of the invention inform later translations. For example, as described elsewhere herein, the level of formality may be determined from the input text and/or the selected translations, and later translation may reflect that determination. Other text may help to identify one or more domains relevant to the document and so inform word choice: for example, references to computers may indicate that "table" refers to a structure in a database, while references to chairs and sofas may indicate that "table" refers to a piece of furniture, which may affect the selection of words in the target language.

Returning to FIG. 4, in block 445, it may be determined whether there is (or may be) additional text to translate. In the context of a document composition system, for example, the system may act as though text remains for translation until the user chooses to end a composition session. If there is remaining text, in an embodiment of the invention, the workflow returns to block 420, where the system may accept more text.

Alternatively, the user may choose to end the composition session, and this choice may be detected in block 445. For example, in an embodiment of the invention such as FIG. 7 depicts, the user may end composition by selecting the control labeled "Publish" 610 or by selecting the control labeled "Save" 615. When the user so chooses, the document may be stored and/or otherwise processed in block 450. It will be appreciated that varied kinds of additional processing and/or editing of a document may be possible after a user ends a session of composition. (The reference to storing a document in this section is meant as a simple example of what may happen at that point, and is not meant to be limiting.)

FIGS. 5-12 describe a multi-lingual document authoring platform, but the same tools may also be integrated into instant messaging and email clients to provide the same functionality. In the latter scenarios, collaboration tools might be less used, and so might not be highlighted as much.

FIG. 5, also described above, is the starting page. A user may create a new translation document project; load, modify, and remove custom dictionaries and translation memories (TMX) (a translation memory is a collection of words and phrases that are mapped to specific translations regardless of the output of the translation system. TMX's are often used to tailor specific translation problem domains. For example, a computer hardware company might use translation memories to always translate "Mouse" as the tracking device in their manuals, even if the sentence contains the words "cheese" and "trap".

A user may also open a previously started project, or a project shared with them that requires their action (collaborative projects may define a workflow). Help and documentation is accessible from this page.

FIG. 6, also described above, is presented if a user chooses to create a new document. Here they can specify the languages to create the document in (the first being the master language by default, though this can be changed at any point), the type of document they wish to create, the formality and sensitivity of the document, as well as basic attributes like the title, and those allowed to edit the project, or who are included in the workflow. Other options that may be specified, e.g., on a page such as FIG. 6 depicts, may include, e.g.:

Type: The type of document is a class specifier that affects the traversal of translation options to find the optimal match. For example, a type might be "Political Journalism", which would make certain translations (such as "table" as a transitive verb related to a motion or subject of discussion) more likely, based on domain-specific corpora.

Sharing: Those people and groups who have permissions to edit this document. Each individual or group has certain attributes, such as the language they will work on, and limits to the types of changes they can make. Furthermore, the "method of distribution" option allows a workflow to be specified so that roles and deadlines can be assigned to each collaborator—i.e., the editors may review the document only after the French translator has reviewed the parts that do not meet the quality bounds provided.

Method of Distribution: In addition to specifying a document workflow, this option also allows the user to choose how the document should be published, i.e., as a PDF document, fed to an API, saved as a file on a network drive, posted as a web-page to a remote server, etc.

Formality and Sensitivity: The user may specify these additional parameters that will affect the kinds of matches returned by the system. Internally, the database of translated works maintains formality scores, which can be constrained by choosing a more formal setting. Sensitivity is a bound on the minimum output quality of the document as determined by the system's matching heuristics. High sensitivity will result in a stricter quality standard, and (probably) a greater need for human review by translators/editors in the various languages.

As illustrated in FIG. 7, also described above, the authoring mode of the system allows for each sentence to be analyzed as it is being written, and suggestions to be flagged to the user based on the closest multi-lingual matches in the database. The matches are ranked in order of likelihood of a match given the specified document constraints. Constraints can be modified at the sentence level to see a broader list of possibilities. The user can select one of the displayed options, or continue with the specific wording they would like, and then choose to flag the item for review. Alternatively, it is possible that more options will be available once additional text has been provided. The lower screen shows the translation into one of the selected languages, which can be hidden or modified as needed. The translation language being displayed can also be changed, as can the authoring language for the document.

Figure 8:
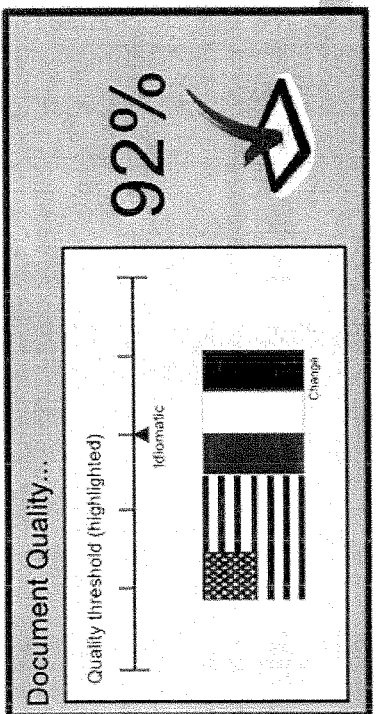

Referring to FIG. 8, document quality analysis may allow the fine tuning of the quality parameter to constrain matching to those sentences where the quality bounds can be (algorithmically/heuristically, to some degree) guaranteed. As the desired base-line quality is raised, the number of sentences that don't meet this cut-off will increase, and more sentences will be marked for review. This threshold is modifiable on a language pair basis, so different language pairs can define different constraints over the same document (e.g., it may be more important for the French translation to be of higher quality).

Referring to FIG. 9, submit to workflow allows the user to modify/approve the next destination of the document in the workflow process. They may also specify whether the document should be sent back to them for further review, and provide notes to their collaborators.

Figure 10:
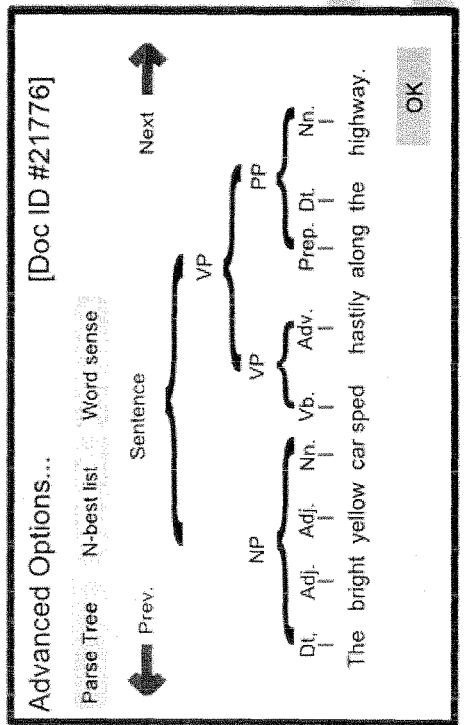

Referring to FIG. 10, advanced options allow the user capabilities that expose parts of the underlying translation system. Expert users may be able to optimize results by making use of this additional information, although most of the time it will not be necessary. As depicted, such options may include, e.g.:

Parse trees: A sentence may be highlighted, and the full parse of that sentence will be shown. The user can cycle through all alternative parses of the sentence, and choose the one that is most accurate, which in turn will affect the translation options found by the system.

N-best list: The statistical translation system maintains n-best lists of translations between language pairs, including sub-sets of sentences, and words. Each item is scored, and the user may select/combine these options in ways different to those inferred by the translation engine.

Word sense: For a selected word in the sentence, the system's best guess for the kinds of contexts this word might exist in, given the current usage, is displayed. A user can cycle through other possibilities, and fine-tune the system's understanding of this word in this particular part of the document. Changes can be left local, or made global across all instances in the document, or added to a translation memory.

Figure 11:
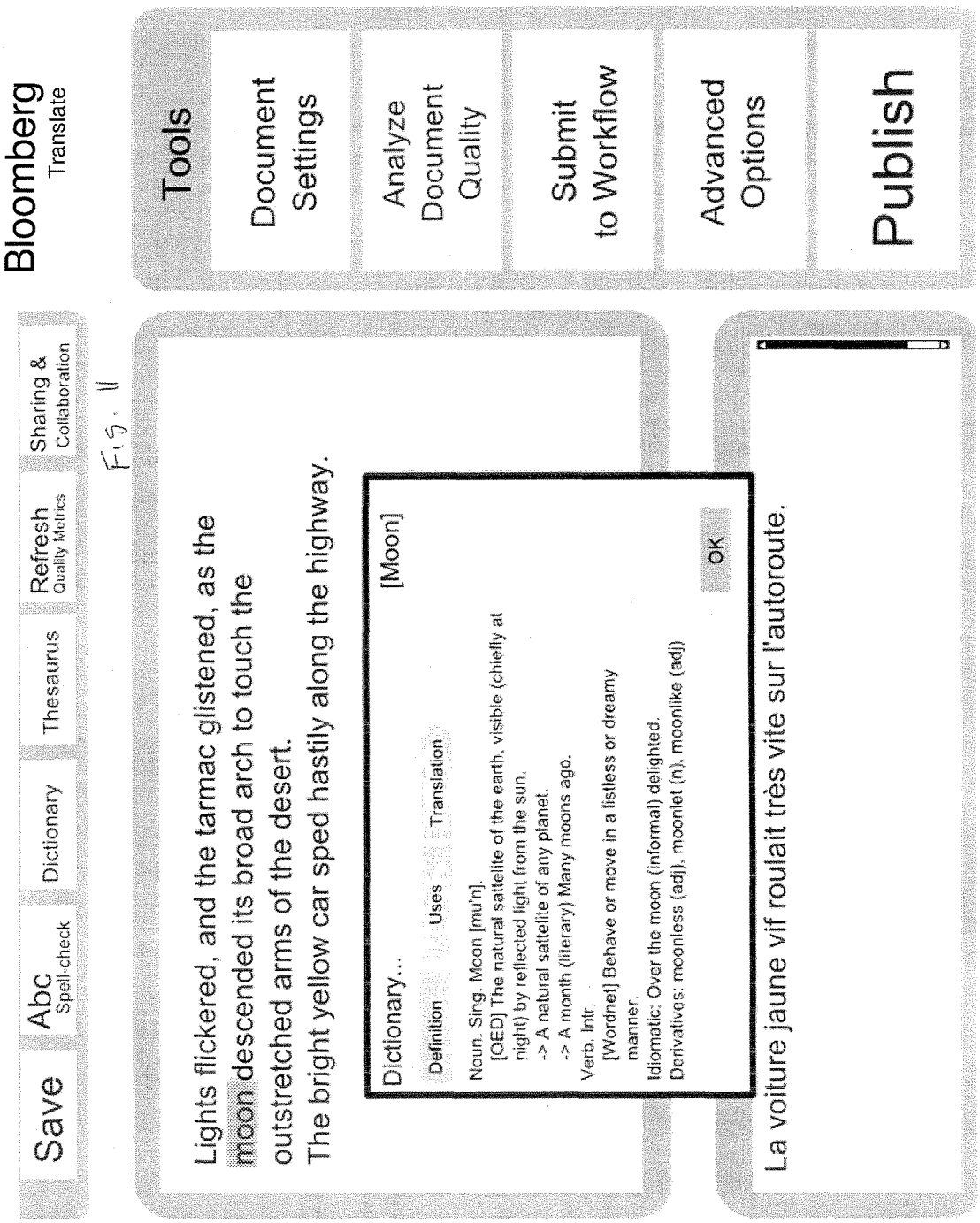

Referring to FIG. 11, the dictionary and thesaurus panels allow a user to reference/look-up certain words and phrases in any of the working languages of the document. The definition of a word (from various sources), along with examples of usage in different contexts, and words that have high corpus-similarity measures, are displayed to the user, and allow them to make educated choices about the language they use, and better manage the options provided by the system.

Figure 12:
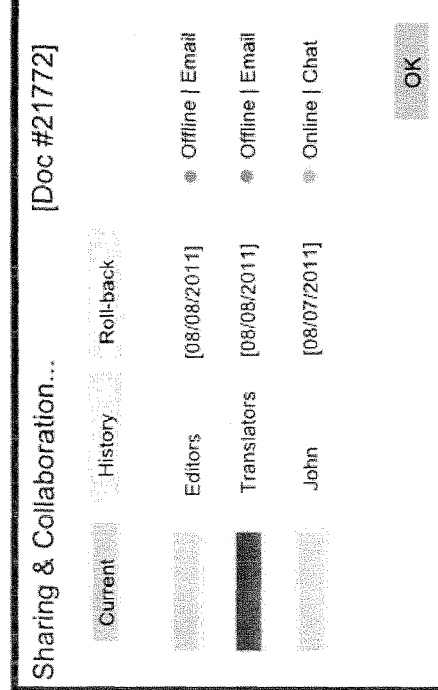

Referring to FIG. 12, the sharing and collaboration pane shows revision history for the document, identifying, e.g., who edited it, and when. These changes can be viewed, rolled back, and collaborators can be contacted directly to resolve any outstanding issues. If a collaborator is online, it may be possible in an embodiment of the invention to chat with them while working on the document.

Although the embodiments of the invention described above relate primarily to interactive translation of text, it will be appreciated that such embodiments, with or without modification, may also translate entire documents at once. For example, such an embodiment may treat the text of the document as if it were simply typed extremely quickly by a user. In such a case, an implementation may proceed chunk-by-chunk through the document, prompting the user when necessary to select from candidate segments in the source language which may be equivalent to each current chunk. Again, as with interactive translation, the translation of text later in a document may be informed by the translation of text encountered earlier.

Embodiments of the invention may be implemented by systems using one or more programmable digital computers. FIG. 13 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one data storage device 120 such as a magnetic disk or an optical disk, and memory 122 such as ROM and RAM, each coupled to the communications channel 112. The communications interface 118 may be coupled to a network (not depicted) such as the Internet.

Although the computer system 100 is shown in FIG. 13 to have only a single communications channel 112, a person skilled in the relevant arts will recognize that a computer system may have multiple channels (not depicted), including for example one or more busses, and that such channels may be interconnected, e.g., by one or more bridges. In such a configuration, components depicted in FIG. 13 as connected by a single channel 112 may interoperate, and may thereby be considered to be coupled to one another, despite being directly connected to different communications channels.

One skilled in the art will recognize that, although the data storage device 120 and memory 122 are depicted as different units, the data storage device 120 and memory 122 can be parts of the same unit or units, and that the functions of one can be shared in whole or in part by the other, e.g., as RAM disks, virtual memory, etc. It will also be appreciated that any particular computer may have multiple components of a given type, e.g., processors 110, input devices 114, communications interfaces 118, etc.

The data storage device 120 (FIG. 13) and/or memory 122 may store instructions executable by one or more processors or kinds of processors 110, data, or both. Some groups of instructions, possibly grouped with data, may make up one or more programs, which may include an operating system 132 such as Microsoft Windows®, Linux®, Mac OS®, or Unix®. Other programs 134 may be stored instead of or in addition to the operating system. It will be appreciated that a computer system may also be implemented on platforms and operating systems other than those mentioned. Any operating system 132 or other program 134, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system 100 (FIG. 13) may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 136, such as, e.g., a magnetic disk drive, magneto-optical drive, optical disk drive, or flash drive, may be coupled to the communications channel 112 for reading from a CRSM 138 such as, e.g., a magnetic disk, a magneto-optical disk, an optical disk, or flash RAM. Alternatively, one or more CRSM readers may be coupled to the rest of the computer system 100, e.g., through a network interface (not depicted) or a communications interface 118. In any such configuration, however, the computer system 100 may receive programs and/or data via the CRSM reader 136. Further, it will be appreciated that the term "memory" herein is intended to include various types of suitable data storage media, whether permanent or temporary, including among other things the data storage device 120, the memory 122, and the CRSM 138.

Two or more computer systems 100 (FIG. 13) may communicate, e.g., in one or more networks, via, e.g., their respective communications interfaces 118 and/or network interfaces (not depicted). FIG. 14 is a block diagram depicting an example of one such interconnected network 142. Network 142 may, for example, connect one or more workstations 144 with each other and with other computer systems, such as file servers 146 or mail servers 148. A workstation 144 may comprise a computer system 100. The connection may be achieved tangibly, e.g., via Ethernet® or optical cables, or wirelessly, e.g., through use of modulated microwave signals according to the IEEE 802.11 family of standards. A computer workstation 144 or system 100 that participates in the network may send data to another computer workstation system in the network via the network connection.

As is known in the art, a computer system may transmit data to a network and/or receive data from a network serially, e.g., according to the standards defining Ethernet®. In such serial transmission or reception, the computer system may send and/or receive, e.g., only one data bit at a time. Nonetheless, because the processor may process data very quickly, and because data may also be transmitted and/or received very quickly, the time required, e.g., to generate, transmit, and/or receive two or more items of data may be so small that the generation, transmission, and/or reception of those multiple items may be considered in effect to take place simultaneously.

One use of a network 142 (FIG. 14) is to enable a computer system to provide services to other computer systems, consume services provided by other computer systems, or both. For example, a file server 146 may provide common storage of files for one or more of the workstations 144 on a network 142. A workstation 144 sends data including a request for a file to the file server 146 via the network 142 and the file server 146 may respond by sending the data from the file back to the requesting workstation 144.

Further, a computer system may simultaneously act as a workstation, a server, and/or a client. For example, as depicted in FIG. 14, a workstation 144 is connected to a printer 152. That workstation 144 may allow users of other workstations on the network 142 to use the printer 152, thereby acting as a print server. At the same time, however, a user may be working at the workstation 144 on a document that is stored on the file server 146.

The network 142 (FIG. 14) may be connected to one or more other networks, e.g., via a router 156. A router 156 may also act as a firewall, monitoring and/or restricting the flow of data to and/or from the network 142 as configured to protect the network. A firewall may alternatively be a separate device (not pictured) from the router 156.

An internet may comprise a network of networks 142 (FIG. 14). The term "the Internet" refers to the worldwide network of interconnected, packet-switched data networks that uses the Internet Protocol (IP) to route and transfer data. In the example depicted in FIG. 3, the Internet 158 provides a communications network over which computer systems in network 142 communicate. For example, a client and server on different networks may communicate via the Internet 158, e.g., a workstation 144 may request a World Wide Web document from a Web Server 160. The Web Server 160 may process the request and pass it to, e.g., an Application Server 162. The Application Server 162 may then conduct further processing, which may include, for example, sending data to and/or receiving data from one or more other data sources. Such a data source may include, e.g., other servers on the same computer system 100 or LAN 102, or a different computer system or LAN and/or a Database Management System ("DBMS") 162.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

The terms "client" and "server" may describe programs and running processes instead of or in addition to their application to computer systems described above. Generally, a (software) client may consume information and/or computational services provided by a (software) server.

The invention claimed is:

1. A method of automatically translating text from one natural language to another using a computer system that comprises one or more processors, one or more interfaces operatively coupled to at least one of the processors, and one or more computer-readable storage media operatively coupled to at least one of the processors, the method comprising:

receiving text in a first language through at least one of the interfaces;

at least one of the processors executing instructions retrieved from at least one of the computer-readable storage media to identify within the text a plurality of segments, each segment comprising a plurality of words and a complete or partial phrase or a complete or partial sentence, with particular ones of the segments having a dependency upon particular other ones of the segments and providing a context for the translating of the text;

at least one of the processors executing instructions retrieved from at least one of the computer readable storage media to generate an intermediate representation of the text using one or more segments of the plurality of segments, and to generate a plurality of first candidate source segments based on the intermediate representation, each of the first candidate source segments differing from the one or more segments and having in a database an exact translation into a second language that is not the first language, at least one first candidate source segment of the plurality of first candidate source segments generated by identifying, using the intermediate representation, one or more invariant symbols over the translating of the text;

in response to receiving input through at least one of the interfaces that selects one of the first candidate source segments, designating the selected first candidate source segment as a first source segment; and at least one of the processors executing instructions retrieved from at least one of the computer-readable storage media to identify in the database a first translation of the first source segment into the second language at least in part by mapping, using a parameterized template, an exact translation of words and phrases in the first source segment into the second language; and wherein the parameterized template includes a templated phrase having at least two parameters, and the mapping identifies words in the first language from the first source segment in place of the at least two parameters and inserts translated counterparts in the second language therefore in the first translation of the first source segment.

2. The method of claim 1, comprising at least one of the processors executing instructions retrieved from at least one of the computer-readable storage media to identify in the database a second translation of the first source segment into a third language that is not the first language or the second language.

3. The method of claim 1, wherein the parameterized template includes a string of constants and constrained variables and each segment of the plurality of segments is examined and tagged for attributes associated with one of the constants or one of the constrained variables, and wherein the parameterized template is identified from a plurality of parameterized templates in the database by matching the tagged attributes of the segment with the plurality of parameterized templates.

4. A computer system for automatically translating text from one natural language to another, the computer system comprising:

one or more processors;

one or more interfaces operatively coupled to at least one of the processors; and one or more computer-readable storage media, operatively coupled to at least one of the processors and encoded with instructions that, when executed by at least one of the processors, cause the computer system at least to:

receive text in a first language through at least one of the interfaces;

identify within the text a plurality of segments, each segment comprising a plurality of words and a complete or partial phrase or a complete or partial sentence, with particular ones of the segments having a dependency upon particular other ones of the segments and providing a context for the translating of the text;

generate an intermediate representation of the text using one or more segments of the plurality of segments;

generate a plurality of first candidate source segments based on the intermediate representation, at least one of the first candidate source segments being generated by at least identifying, using the intermediate representation, one or more invariant symbols over the translating of the text, each of the first candidate source segments differing from the segments and having in a database an exact translation into a second language that is not the first language;

in response to receiving input through at least one of the interfaces that selects one of the first candidate source segments, designate the selected first candidate source segment as a first source segment; and identify in the database a first translation of the first source segment into the second language at least in part by mapping, using a parameterized template, an exact translation of words and phrases in the first source segment into the second language;

and wherein the parameterized template includes a templated phrase having at least two parameters, and the mapping identifies words in the first language from the first source segment in place of the at least two parameters and inserts translated counterparts in the second language therefore in the first translation of the first source segment.

5. The computer system of claim 4, wherein the instructions comprise instructions that, when executed by at least one of the processors, cause the computer system at least to identify in the database a second translation of the first source segment into a third language that is not the first language or the second language.

6. The computer system of claim 5, wherein the parameterized template includes a string of constants and constrained variables and each segment of the plurality of segments is examined and tagged for attributes associated with one of the constants or one of the constrained variables, and wherein the parameterized template is identified from a plurality of parameterized templates in the database by matching the tagged attributes of the segment with the plurality of parameterized templates.

7. A non-transitory computer-readable storage medium encoded with instructions that, when executed by one or more processors within a computer system that comprises one or more interfaces operatively coupled to at least one of the processors, cause the computer system at least to:
receive text in a first language through at least one of the interfaces;
identify within the text a plurality of segments, each segment comprising a plurality of words and a complete or partial phrase or a complete or partial sentence, with particular ones of the segments having a dependency upon particular other ones of the segments and providing a context for translating the text;
generate an intermediate representation of the text using one or more segments of the plurality of segments;
generate a plurality of first candidate source segments using the intermediate representation, at least one of the first candidate source segments being generated by at least identifying, using the intermediate representation, one or more invariant symbols over the translating of the text, each of the first candidate source segments differing from the one or more segments and having in a database an exact translation into a second language that is not the first language;
in response to receiving input through at least one of the interfaces that selects one of the first candidate source segments, designate the selected first candidate source segment as a first source segment; and
identify in the database a first translation of the first source segment into the second language at least in part by mapping, using a parameterized template, an exact translation of words and phrases in the first source segment into the second language; and
wherein the parameterized template includes a templated phrase having at least two parameters, and the mapping identifies words in the first language from the first source segment in place of the at least two parameters and inserts translated counterparts in the second language therefore in the first translation of the first source segment.

8. The non-transitory computer-readable storage medium of claim 7, wherein the instructions comprise instructions that, when executed by at least one of the processors, cause the computer system at least to identify in the database a second translation of the first source segment into a third language that is not the first language or the second language.

9. The non-transitory computer-readable storage medium of claim 8, wherein parameterized template includes a string of constants and constrained variables and each segment of the plurality of segments is examined and tagged for attributes associated with one of the constants or one of the constrained variables, and wherein the parameterized template is identified from a plurality of parameterized templates in the database by matching the tagged attributes of the segment with the plurality of parameterized templates.

10. The method of claim 1 wherein the intermediate representation includes a representation of the text as a parse tree.

11. The method of claim 10 wherein the parse tree indicates one or more relationship among the text of the intermediate representation.

12. The method of claim 10 further comprising:
transliterating one or more of portions of the intermediate representation.

13. The computer system of claim 4 wherein the intermediate representation includes a representation of the text as a parse tree.

14. The computer system of claim 13 wherein the parse tree indicates one or more relationship among the text of the intermediate representation.

15. The computer system of claim 13 further comprising:
transliterating one or more of portions of the intermediate representation.

16. The non-transitory computer-readable storage medium of claim 7 wherein the intermediate representation includes a representation of the text as a parse tree.

17. The non-transitory computer-readable storage medium of claim 16 wherein the parse tree indicates one or more relationship among the text of the intermediate representation.

* * * * *